Patented Mar. 19, 1929.

1,706,196

UNITED STATES PATENT OFFICE.

ALBERT VOHL AND WILHELM WACHTENDORF, OF GOTTINGEN, GERMANY.

PROCESS FOR THE PURIFICATION OF SOLUTIONS OF METAL SALTS.

No Drawing. Application filed January 3, 1927. Serial No. 158,815, and in Germany December 24, 1925.

This invention has reference to a process for the purification of solutions of metal salts, and it refers more particularly to the recovery of the metal salts from the treatment of cellulose fibers and the like. The dilute solutions of metal salts, such as chloride of zinc and the like obtained in the process of manufacture of vulcan-fiber, of parchment paper, artificial silk and the like usually contain cellulose slimes, particles of fiber and decomposition products of the cellulose and dissolved iron compounds.

Now in accordance with our invention a very complete and satisfactory purification of such solutions of metal salts has become possible, so that a very high-grade, for instance white article free from discolorations may be obtained by means of the recovered concentrated solutions. In accordance with our invention the process of purification is carried out in such a manner that the metal-ions of the precipitating chemical reagents employed in the process of purification are identical with the metal of the solution of metal salts to be purified, while on the other hand the increase in percentage of any metal-salts compounds differing therefrom is prevented by causing them to be precipitated from the dilute solution. For the purpose of removing the iron, the solutions to be purified, such as for instance a solution of chloride of zinc, are treated before filtration with any of the known oxidizing and iron-precipitating agents. Thus we may proceed for instance by passing chlorine into the solution in which oxide of zinc or carbonate of barium or the like may be kept suspended; or the solution may be treated with hydrogen-peroxide, or it is treated after acidification with oxide of zinc, barium-peroxide and the like; and thereafter with oxide of zinc, carbonate of barium and the like. In order to keep the solutions free from foreign bodies metal compounds are employed as precipitating agents corresponding to the metal-ions of the solutions to be purified; thus, in the case of a solution of chloride of zinc the precipitants will comprise zinc compounds or such compounds, such as for instance barium-compounds whose salts obtained as a result of the precipitation may be readily removed by the addition of zinc salts, such as for instance by means of zinc sulphate in the form of barium-sulphate.

The solutions, after having been purified from coarse impurities and iron are evaporated in cast-iron flat dishes with an acid-proof enamel or lining, and preferably arranged in cascade or step-like manner.

The organic ingredients contained in the solution cause blackening and the separation of particles of carbon during concentration. The solutions are therefore treated with oxidizing agents before or during concentration for the purpose of destroying the organic substances. Thus, we may treat the solutions with chloric acid or with chlorates, or with nitric acid or permanganates and the like. Also in this step of the treatment such oxidizing agents are selected the residues of which are not liable to introduce foreign metal-ions into the solution, or which may be easily removed. One of the oxidizing agents first mentioned is for instance chlorate of zinc, while as an example of the latter modification we may mention for instance chlorate of barium.

By the oxiding procedure the iron of which small amounts may still happen to be present in the solution is converted into colored, generally yellow compounds. By the addition of small amounts of zinc, and preferably in powdered condition, and of acid, the iron may be easily reduced again, so that the solution thus purified becomes perfectly white, and may be re-introduced into the process of manufacture.

The manner of carrying out the process may be substantially inferred from the following examples:—

*Example I.*—The solution of chloride of zinc of 35° Bé. strength obtained as the waste liquor from the extracting and washing baths in the manufacture of vulcan-fibre is treated without heating with hydrogen-peroxide, until a test fails to show any more ferro-ions. Thereupon zinc-carbonate suspended in water is added with constant agitation, until an examination of the filtrate fails to show the presence of ferric-chloride. After filtration with the addition of 3% kieselguhr the solution is passed to the evaporating section of the plant. In the proportion as the solution becomes darker during concentration, a saturated solution of chlorate of zinc is added in small successive quantities, in order to destroy the dissolved decomposition products of cellulose. At a concentration of 65° Bé. the process is finished and the solution retains its light color. Then continue to boil for a short time, so as to remove any dissolved chlorine-compounds, and then 1% hydrochloric-acid is added and the corresponding quantity of zinc dust in small successive quantities, while boiling cautiously. After having by this means produced the complete reduction of the traces of iron, still existing in the solution and part of which is introduced from the pipe conduits and the like, the solution is further heated, until it shows a density of 70 degrees Bé. and the contents of hydrochloric acid has been reduced to 0.1%. Then the solution may be used over again in the process of manufacture, and after having undergone the usual manufacturing process, and it has gone into the lixiviating baths, it may be again submitted to the process according to this invention.

*Example II.*—The solution of chloride of zinc of 30° Bé. with approximately 0.3% hydrochloric acid contained therein, and resulting in the parchment-making process and containing as impurities cellulose-fibres, amyloid-slimes, cellulose-decomposition products and iron is first tested for the amount of iron present, and is then treated with an excess of barium-peroxide and suspended in water, the solution being vigorously stirred, but not heated during the treatment which is continued, until it fails to show any more ferro-ions. The precipitation of the ferric-chloride produced is effected by the addition of a corresponding amount of barium-carbonate. Then a saturated solution of sulphate of zinc is added, until all the barium-ions have been precipitated as barium-sulphate. Now the coarse cellulose-particles and the precipitated iron compounds and barium compounds are separated off by filtration and the bright, clear solution of chloride of zinc obtained is concentrated in flat dishes. As soon as the concentration of the solution has reached 55 degrees Bé. powdered chlorate of barium in the required amount is added for the purpose of the destruction of the organic impurities. The barium-chloride formed thereby is submitted to mutual decomposition with sulphate of zinc in the diluted solution in the course of the further treatment, as above outlined, forming chloride of zinc and insoluble sulphate of barium which is easily separated.

*Example III.*—The procedure is the same as outlined with reference to the second example with the difference however that the resulting dilute solution is treated with 1½ (one and one half) times the amount of bromine calculated to oxidize the ferro-compounds present and dissolved in water, the solution being vigorously agitated. The precipitation of the iron is effected by the addition of a corresponding amount of saturated barium hydroxide solution.

*Example IV.*—The process of recovery is carried out, as outlined with reference to Example II with that difference that the oxidation of the iron compounds is effected by means of zinc-peroxide, while the oxidation of the dissolved organic substances is effected during evaporation by the addition of a 20% solution of chloric acid.

It is to be understood that our invention may be carried out in a number of ways different from the embodiments hereinbefore described by way of exemplification and illustration only, no other limitations being intended than hereinafter set forth in the appended claims.

We claim:—

1. The process of purifying and recovering solutions of zinc salts containing inorganic and organic and fibrous impurities, which consists in oxidizing and subsequently precipitating the iron contained in the solution by means of alkaline zinc salts, separating off the resulting solution, concentrating the solution and during concentration adding oxidizing agents thereto.

2. The process of purifying and recovering solutions of zinc salts containing inorganic and organic and fibrous impurities, which consists in oxidizing and subsequently precipitating compounds of the iron group contained therein, removing the precipitant by decomposition with a zinc-salt, separating off the resulting solution, concentrating the solution and during concentration adding an oxidizing agent thereto and finally concentrating the solution to a density, substantially not above about 65 degrees Bé.

3. The process of purifying and recovering solutions of zinc salts containing inorganic, organic and fibrous impurities, which consists in oxidizing and subsequently precipitating existing compounds of the iron group, removing the precipitate and precipitating agents other than zinc compounds, evaporating and heating the resulting solution in the presence of chlorate of zinc to a density substantially not above 65 degrees Bé. and converting any remaining traces of iron into substantially colorless reduced compounds.

4. The process of purifying and recovering solutions of zinc salts containing inorganic, organic and fibrous impurities, which consists in oxidizing and subsequently precipitating existing compounds of the iron group, removing the precipitate and precipitating agents other than zinc compounds, partially evaporating and heating the resulting solution with an oxidizing agent to a density substantially not above 65 degrees Bé., and reducing any remaining traces of iron in the solution.

5. The process of purifying and recovering solutions of zinc salts containing inorganic, organic and fibrous impurities, which consists in oxidizing and removing existing compounds of the iron group contained therein and precipitating agents other than zinc compounds, evaporating and heating the resulting solution with an oxidizing agent to a density, substantially not above 65 degrees Bé., and adding zinc powder and hydrochloric acid, so as to reduce any existing traces of iron, and recovering the solution.

6. The process of purifying and recovering solutions of zinc salts, containing impurities, which consists in oxidizing and removing existing compounds of the iron group and removing precipitating agents other than zinc compounds, evaporating and heating the resulting solution with an oxidizing agent, adding zinc powder and hydrochloric acid, so as to reduce any existing traces of iron, continuing the heating and recovering the solution.

In testimony whereof we affix our signatures.

ALBERT VOHL.
WILHELM WACHTENDORF.